Figure 1:
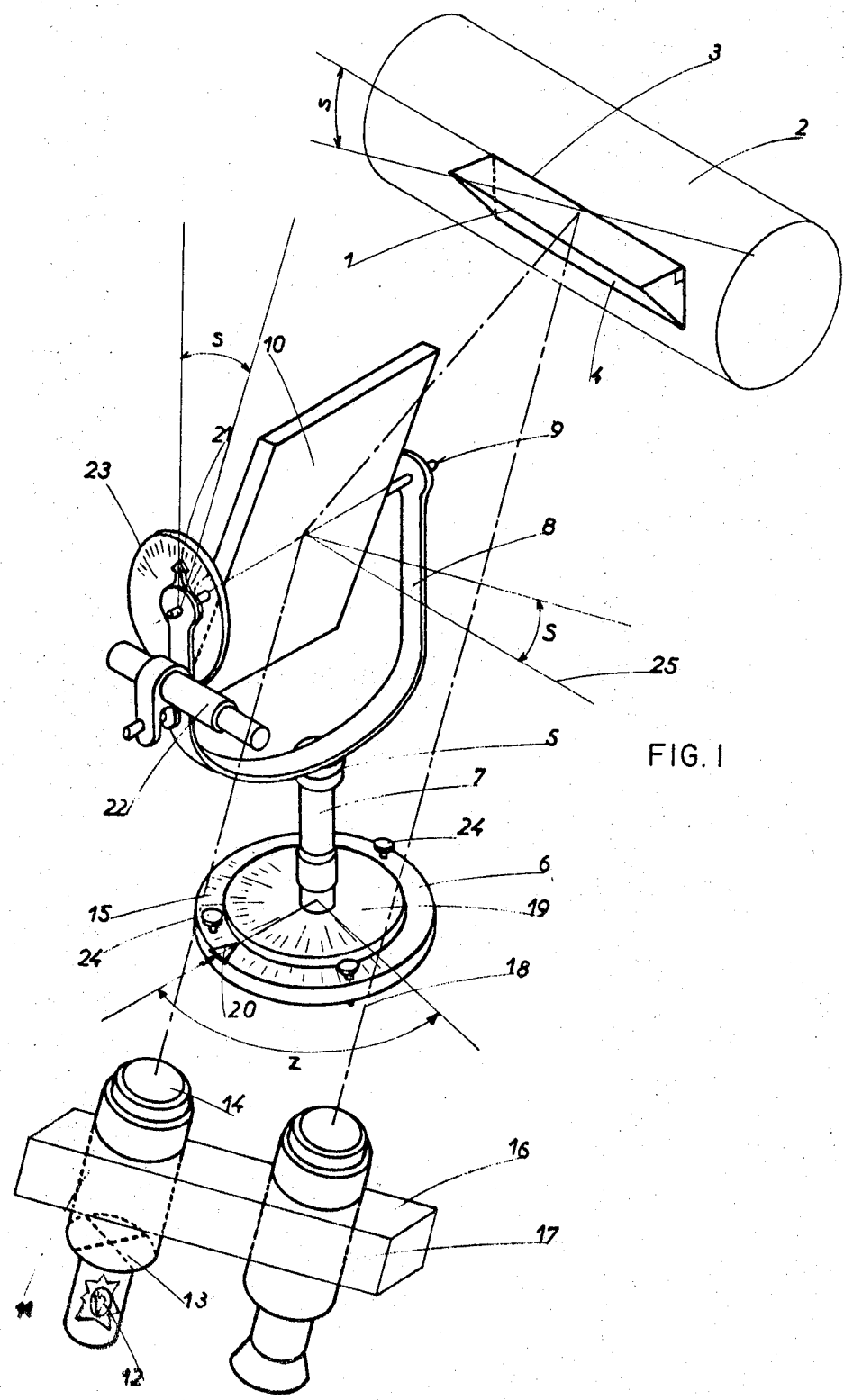

United States Patent

[11] 3,575,512

| [72] | Inventor | Jean Baboz<br>Saint-Mande (Val De Marne), France |
|---|---|---|
| [21] | Appl. No. | 866,472 |
| [22] | Filed | Oct. 15, 1969 |
| [45] | Patented | Apr. 20, 1971 |
| [73] | Assignee | Societe D'Optique, Precision, Electronique Et. Mecanique (Sopelem)<br>Paris, France |
| [32] | Priority | Oct. 29, 1968 |
| [33] | | France |
| [31] | | 171839 |

[54] OPTICAL APPARATUS FOR DETERMINING THE ORIENTATION OF AN OBJECT WITH RESPECT TO REFERENCE AXES
9 Claims, 2 Drawing Figs.

[52] U.S. Cl. .................................................. 356/138, 356/153
[51] Int. Cl. .................................................. G01b 11/27
[50] Field of Search .................................. 356/147, 153, 255; 356/138

[56] References Cited
UNITED STATES PATENTS
2,906,161  9/1959  Thompson .................. 356/153

*Primary Examiner*—Ronald L. Wibert
*Assistant Examiner*—Orville B. Chew, II
*Attorney*—Cameron, Kerkam & Sutton

ABSTRACT: two present invention is concerned with apparatus for determining the orientation of an object relative to a system of reference axes, said system comprising tow plane reflecting surfaces which are disposed at 90° to each other, are fixed relative to the object and are arranged to receive an image from a further plane reflecting surface which is pivotally mounted on a theodolite, a collimator whose optical axis is directed towards said further reflecting surface, a telescope whose optical axis is parallel to that of the collimator and which will receive the image of the collimator reticule after reflection at the three said reflecting surfaces when said further reflecting surface is in a plane perpendicular to the line of intersection of the planes containing said two reflecting surfaces, and means for determining the position of said further reflecting surface on the theodolite.

OPTICAL APPARATUS FOR DETERMINING THE ORIENTATION OF AN OBJECT WITH RESPECT TO REFERENCE AXES

The invention relates to apparatus for determining the orientation of an object relative to a system of reference axes.

It is sometimes necessary to determine the precise orientation of certain objects, such as a receiver or aerial, which may be difficult to measure directly. To this end, a preferred direction of this object is often produced by means of a reflective prism attached to the object. It is then possible, by means of optical systems some distance from the object, to determine very precisely the direction of the ridge of the prism, which may be small and may be located on the object according to the structure of the latter. Unfortunately, however, the optical systems used are fairly complicated and they are difficult to use.

An object of the invention is to provide a device for determining the orientation of an object by means of a very simple, easily controlled optical system.

The invention relies on the properties of an optical system consisting of three plane mirrors which together form a trirectangular trihedron. In such a system, of course, any incident ray falling on one of the mirrors produces, after being reflected in the three mirrors, a reflected ray parallel to the incident ray, whatever the direction of the latter.

According to the invention, there is provided apparatus for determining the orientation of an object relative to a system of reference axes, said system comprising two reflecting surfaces which are disposed at 90° to each other, are fixed relative to the object and are arranged to receive an image from a further reflecting surface which is pivotally mounted on a theodolite, a collimator whose optical axis is directed towards said further reflecting surface, a telescope whose optical axis is parallel to that of the collimator and which will receive the image of the collimator reticule after reflection at the three said reflecting surfaces when said further reflecting surface is in a plane perpendicular to the line of intersection of the planes containing said two reflecting surfaces, and means for determining the position of said further reflecting surface on the theodolite.

Preferably, said two reflecting surfaces belong to a 90° prism whose ridge between those surfaces is fixed relative to the object and whose base spanning those surfaces is directed towards said further reflecting surface.

Figure 2:
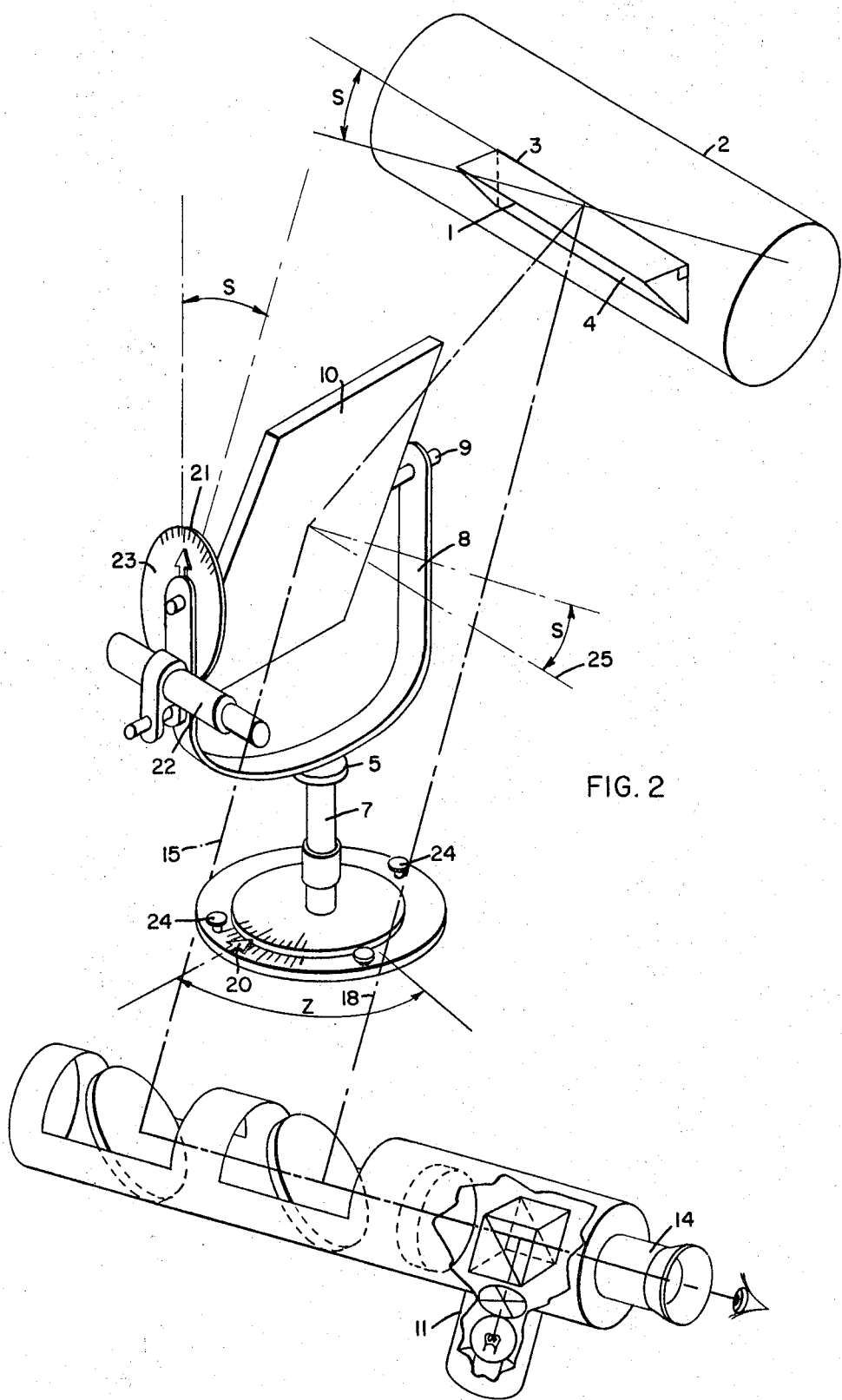

The invention will now be described in more detail with reference to a particular embodiment, given by way of example only and illustrated in the accompanying drawings in which FIG. 1 shows a preferred embodiment thereof and FIG. 2 shows a slight modification of FIG. 1 in the arrangement of the collimator and telescope.

A 90° prism 1 in FIG. 1 is attached to an object 2 whose orientation is to be determined. The ridge 3 of the prism is parallel to the direction of the object which is to be located. The base 4 of the prism 1 faces a theodolite 5 with a foot 6 and a pivoting leg 7. This leg is aligned with the principal axis of the theodolite, perpendicular to the foot 6, and an alidade 8 attached to this leg supports the theodolite pivots 9 on which a plane mirror 10 is pivotably mounted.

A collimator 11, with a light source 12, crosshairs 13 and a lens 14 sends a beam 15 in the direction of the mirror 10. The collimator 11 is attached to a relatively fixed support 16.

A telescope 17 with a reticule, not shown, is mounted, also on the support 16, in such a way that its optical axis is parallel to that of the collimator.

The position and orientation of the theodolite 5 are so adjusted that the beam 15 from the collimator 11 is reflected towards the prism 1 by the mirror 10. The theodolite can be clamped relative to the reference system, for example by means of clamping screws 24.

The mirror 10 is pivoted about the theodolite pivot 7 and about the pivots 9 until it is in a plane perpendicular to the ridge 3 of the prism 1. When the mirror is in this position it forms a trirectangular trihedron with the two faces of the prism, and the incident beam 15, after being reflected by the mirror 10 and prism 1, gives a reflected beam 18 parallel to the beam 15.

The position of the telescope 17 on the support 16 is adjusted so that the eyepiece receives the reflected beam 18.

Since adjustment involves slight variations, it is possible to select a suitable position and orientation of the theodolite 5, collimator 11 and telescope eyepiece once and for all.

To each orientation of the prism 1, therefore, there corresponds a single position of the mirror 10, giving a reflected beam 18 precisely parallel to the incident beam 15, so that the image of the crosshairs 13 coincides with the reticule crosshairs of the telescope 17. As a result very high precision is obtained. The ridge 3 of the prism is therefore parallel to the perpendicular 25 to the mirror when the beam 18 is received by the telescope 17, if the said crosshairs coincide. The spatial orientation of the perpendicular is governed by the spatial orientation of the mirror and is accurately defined by reading off the positions of two indicators 20, 21, situated on graduated rings 19, 23 respectively.

The ring 19, which is located at the base of the leg 7, is mounted so that it rotates with the alidade 8, the angle of rotation being determined relative to the indicator 20 attached to the foot 6. The ring 23, which is mounted on one of the pivots 9, is adapted to rotate with the plane mirror 10, the angle of rotation being determined relative to the indicator 21 which is attached to the alidade 8.

The horizontal azimuth Z and the elevation S of the perpendicular are therefore defined. The origin of the azimuth measurements may be defined in any known manner, for example by means of a telescope 22 attached to the theodolite and enabling a sight to be taken on a reference point whose position is known or reciprocal sighting to be carried out.

Obviously, the invention is not restricted to the details of the embodiment just described. In particular, the vertical ring 19 is not required if it is merely necessary to know the horizontal azimuth of the ridge 3, i.e. the perpendicular to the mirror.

The telescope 22 might have, as its means for sighting in elevation, the mirror 10 itself; the telescope 22 might, for example, be placed in the pivot 7 of the theodolite, sights being taken by way of the mirror 10. Also, the origin of the azimuths might be defined in any other manner. For example, if the apparatus is mounted on a moving body, the azimuth zero might be defined by means of a gyroscopic system.

Lastly, the collimator 11 and telescope 17 might be replaced by a self-collimating telescope as in FIG. 2, the reflected beam 18 being reflected on the telescope by a system of parallel mirrors rigidly attached to the support 16, and adjustment being more precise due to the superimposing of the crosshairs.

I claim:

1. Apparatus for determining the orientation of an object relative to a system of reference axes, said system comprising two reflecting surfaces which are disposed at 90° to each other, are fixed relative to the object and are arranged to receive an image from a further reflecting surface which is pivotally mounted on a theodolite, a collimator whose optical axis is directed towards said further reflecting surface, a telescope whose optical axis is parallel to that of the collimator and which will receive the image of the collimator reticule after reflection at the three said reflecting surfaces when said further reflecting surface is in a plane perpendicular to the line of intersection of the planes containing said two reflecting surfaces, and means for determining the position of said further reflecting surface on the theodolite.

2. Apparatus according to claim 1, wherein said two reflecting surfaces belong to a 90° prism whose ridge between those surfaces is fixed relative to the object and whose base spanning those surfaces is directed towards said further reflecting surface.

3. Apparatus according to claim 1, wherein said further reflecting surface is provided by a mirror.

4. Apparatus according to claim 1, wherein the means for determining the position of said further reflecting surface comprises a graduated ring for measuring deviation in azimuth, which ring is perpendicular to the principal axis of the theodolite and which is pivotable with an alidade, and an indicator whose position is defined relative to a reference system.

5. Apparatus according to claim 1, wherein the means for determining the position of said further reflecting surface comprises a graduated ring for measuring deviation in elevation, which ring is mounted to turn with said further reflecting surface, and an indicator whose position is defined relative to a reference system.

6. Apparatus according to claim 1, wherein the collimator and telescope are combined in a self-collimating telescope in which the returning beam will be reflected by a system of mirrors.

7. Apparatus according to claim 1, wherein the position of the theodolite can be defined relative to a reference system by means of a telescope which is mounted on the theodolite and which can sight a reference point.

8. Apparatus according to claim 7, wherein the sighting telescope for the theodolite is rigidly attached to the alidade and can sight a reference point by way of said further reflecting surface.

9. Apparatus according to claim 7, wherein the sighting telescope for the theodolite is placed in the pivot of the theodolite.